US012046823B2

(12) United States Patent
Lin et al.

(10) Patent No.: US 12,046,823 B2
(45) Date of Patent: Jul. 23, 2024

(54) COMMUNICATION DEVICE FOR ANTENNA ADJUSTMENT

(71) Applicant: HTC Corporation, Taoyuan (TW)

(72) Inventors: Cheng-Hung Lin, Taoyuan (TW); Szu-Po Wang, Taoyuan (TW); Chia-Te Chien, Taoyuan (TW); Chun-Chieh Wang, Taoyuan (TW); Kang-Ling Li, Taoyuan (TW); Chun-Hsien Lee, Taoyuan (TW); Yu-Chieh Chiu, Taoyuan (TW)

(73) Assignee: HTC CORPORATION, Taoyuan (TW)

( * ) Notice: Subject to any disclaimer, the term of this patent is extended or adjusted under 35 U.S.C. 154(b) by 0 days.

(21) Appl. No.: 17/712,627

(22) Filed: Apr. 4, 2022

(65) Prior Publication Data

US 2023/0318204 A1 Oct. 5, 2023

(51) Int. Cl.

*H01Q 21/20* (2006.01)
*H01Q 1/12* (2006.01)
*H01Q 9/04* (2006.01)

(52) U.S. Cl.

CPC ........... *H01Q 21/205* (2013.01); *H01Q 1/125* (2013.01); *H01Q 9/0457* (2013.01)

(58) Field of Classification Search

CPC ............................. H01Q 1/125; H01Q 9/0457
See application file for complete search history.

(56) References Cited

U.S. PATENT DOCUMENTS 4,843,809 A 7/1989 Krawietz
5,801,660 A 9/1998 Ohtsuka et al.
6,100,846 A 8/2000 Li et al.
9,964,995 B1 * 5/2018 Morrison ............ H01Q 1/2266
2006/0258013 A1 11/2006 Lazar
2013/0321216 A1 * 12/2013 Jervis .................. H04M 1/0216 343/702
2018/0076516 A1 * 3/2018 Palmieri .................. H01Q 3/02
2019/0280363 A1 * 9/2019 Dahle .................. H01Q 21/065
2020/0313274 A1 * 10/2020 Wu ...................... G06F 1/1652

FOREIGN PATENT DOCUMENTS

CN 110492244 A * 11/2019 ............... G06F 1/16
CN 112787108 A 5/2021
JP 2006-185828 A 6/2006

(Continued)

OTHER PUBLICATIONS

PTPE Properties, Captured by Wayback Machine on Nov. 30, 2021, PTFE Applied Coatings, https://www.fluoroprecision.co.uk/ptfe/ptfe-properties (Year: 2021).*

*Primary Examiner* — Dameon E Levi
*Assistant Examiner* — Anh N Ho
(74) *Attorney, Agent, or Firm* — Birch, Stewart, Kolasch & Birch, LLP

(57) ABSTRACT

A communication device includes a nonconductive track, an antenna element, a first turning wheel, and a second turning wheel. The antenna element is disposed on the nonconductive track. The first turning wheel and the second turning wheel drive the nonconductive track according to a control signal, so as to adjust the position of the antenna element. The communication device provides an almost omnidirectional radiation pattern.

14 Claims, 8 Drawing Sheets

(56) References Cited

FOREIGN PATENT DOCUMENTS

| | | | | |
|---|---|---|---|---|
| JP | 2006165628 | A | * | 6/2006 |
| KR | 20220039390 | A | * | 3/2022 |
| TW | 516283 | B | | 1/2003 |
| TW | 200820496 | A | | 5/2008 |
| TW | 200835197 | A | | 8/2008 |
| TW | M381901 | U1 | | 6/2010 |
| TW | 202107771 | A | | 2/2021 |
| WO | WO 2017/032107 | A1 | | 3/2017 |

* cited by examiner

100

100

COMMUNICATION DEVICE FOR ANTENNA ADJUSTMENT

BACKGROUND OF THE INVENTION

Field of the Invention

The disclosure generally relates to a communication device, and more particularly, to a communication device and an antenna structure therein.

Description of the Related Art

With the advancements being made in mobile communication technology, mobile devices such as portable computers, mobile phones, multimedia players, and other hybrid functional portable electronic devices have become more common. To satisfy user demand, mobile devices can usually perform wireless communication functions. Some devices cover a large wireless communication area; these include mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, and 2500 MHz Some devices cover a small wireless communication area; these include mobile phones using Wi-Fi and Bluetooth systems and using frequency bands of 2.4 GHz, 5.2 GHz, and 5.8 GHz.

Wireless access points are indispensable elements that allow mobile devices in a room to connect to the Internet at high speeds. However, since indoor environments have serious problems with signal reflection and multipath fading, wireless access points should process signals from a variety of transmission directions simultaneously. Accordingly, it has become a critical challenge for current designers to design an omnidirectional antenna system in the limited space of a wireless access point.

BRIEF SUMMARY OF THE INVENTION

In a preferred embodiment, the invention proposes a communication device that includes a nonconductive track, an antenna element, a first turning wheel, and a second turning wheel. The antenna element is disposed on the nonconductive track. The first turning wheel and the second turning wheel drive the nonconductive track according to a control signal, so as to adjust the position of the antenna element.

In some embodiments, the communication device provides an almost omnidirectional radiation pattern.

In some embodiments, the nonconductive track is made of a rubbery material.

In some embodiments, the communication device further includes a control motor element configured to generate the control signal.

In some embodiments, by controlling the nonconductive track, the control motor element makes the antenna element generate a top radiation pattern, a bottom radiation pattern, a left radiation pattern, and a right radiation pattern.

In some embodiments, the antenna element is a patch antenna.

In some embodiments, the antenna element covers an operational frequency band from 2400 MHz to 2500 MHz.

In some embodiments, the length of the antenna element is substantially equal to 0.5 wavelength of the operational frequency band.

In some embodiments, the antenna element covers an mmWave (Millimeter Wave) frequency band.

In some embodiments, the communication device further includes a signal source and a cable. The signal source is coupled through the cable to the antenna element.

In some embodiments, the communication device further a ground element. The ground element has a closed loop shape. The ground element is surrounded by the nonconductive track.

In some embodiments, the antenna element is a coupling feeding antenna.

In some embodiments, the antenna element includes a main radiation element.

In some embodiments, the main radiation element has a rectangular shape or a square shape.

In some embodiments, the communication device further includes a signal source, a coupling feeding element, and a dielectric substrate. The coupling feeding element is coupled to the signal source. The coupling feeding element is adjacent to the main radiation element. The signal source and the coupling feeding element are disposed on the dielectric substrate.

In some embodiments, the coupling feeding element includes a plurality of feeding branches.

In some embodiments, the coupling feeding element further includes a switch circuit for selectively using one of the feeding branches.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1A:
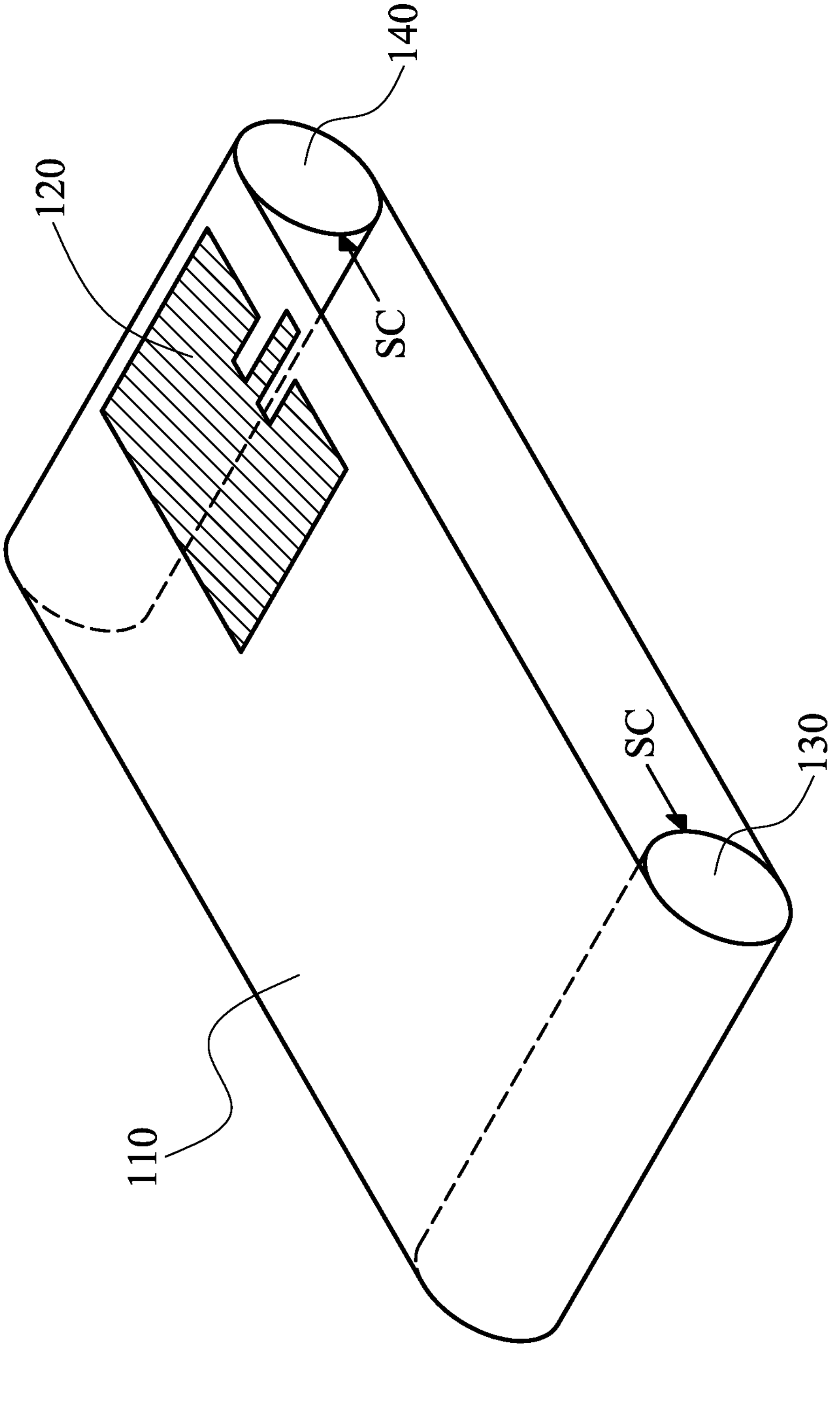
FIG. 1A is a perspective view of a communication device according to an embodiment of the invention.

In order to illustrate the foregoing and other purposes, features and advantages of the invention, the embodiments and figures of the invention will be described in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms “include” and “comprise” are used in an open-ended fashion, and thus should be interpreted to mean “include, but not limited to . . . ”. The term “substantially” means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the subject matter provided. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1A is a perspective view of a communication device 100 according to an embodiment of the invention. The communication device 100 may be applied to a wireless access point or a mobile device, such as a smart phone, a table computer, or a notebook computer. In the embodiment of FIG. 1A, the communication device 100 includes a nonconductive track 110, an antenna element 120, a first turning wheel 130, and a second turning wheel 140. The antenna element 120 may be made of a metal material, such as copper, silver, aluminum, iron, or their alloys. It should be understood that the communication device 100 may further include other components, such as a processor, a touch control panel, a speaker, a power supply module, and/or a housing, although they are not displayed in FIG. 1A.

For example, the nonconductive track 110 may be made of a rubbery material, and it may substantially have a loop shape. The antenna element 120 is disposed or fixed on an outer surface of the nonconductive track 110. The shape and type of the antenna element 120 are not limited in the invention. For example, the antenna element 120 may be a patch antenna, a monopole antenna, a dipole antenna, a loop antenna, a PIFA (Planar Inverted F Antenna), or a chip antenna.

Figure 1B:
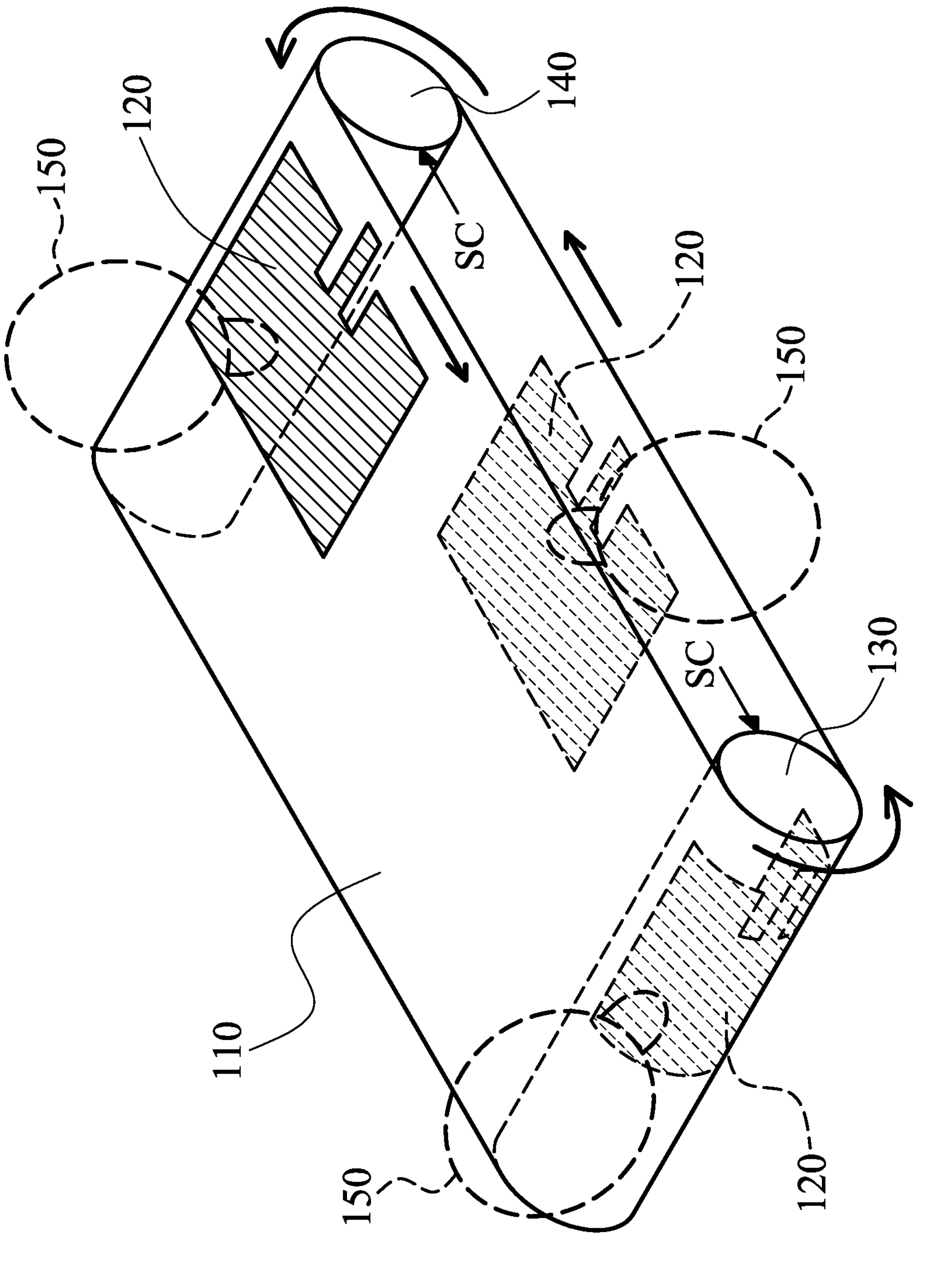
FIG. 1B is a diagram of operations of a communication device according to an embodiment of the invention.

FIG. 1B is a diagram of operations of the communication device 100 according to an embodiment of the invention. In the embodiment of FIG. 1B, the first turning wheel 130 and the second turning wheel 140 can drive the nonconductive track 110 according to a control signal SC, so as to adjust the position of the antenna element 120. Therefore, by appropriately changing the position of the antenna element 120, the communication device 100 can provide an almost omni-directional radiation pattern 150. That is, the main beam of the radiation pattern 150 of the antenna element 120 has an adjustable direction.

Figure 2:
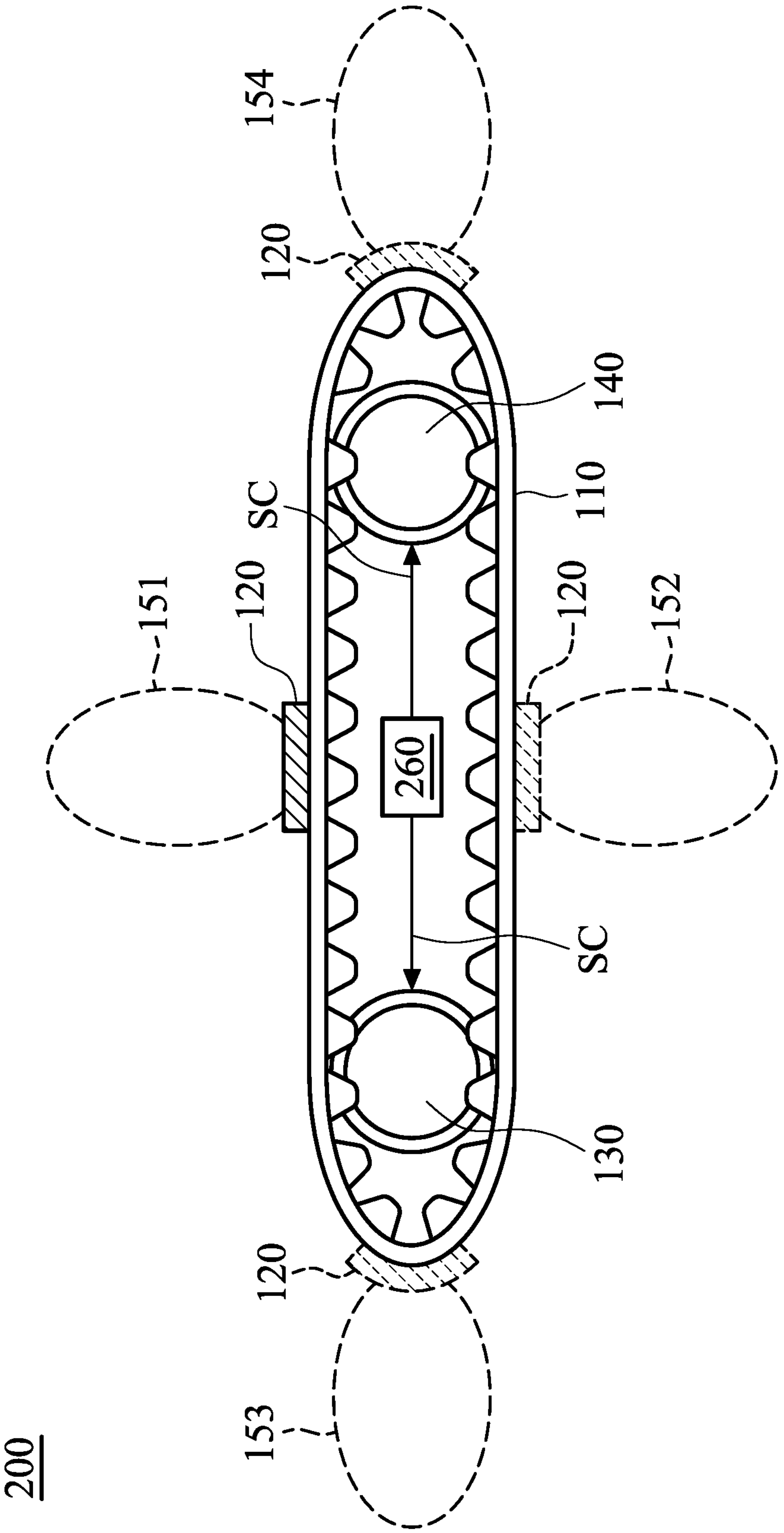
FIG. 2 is a sectional view of a communication device according to an embodiment of the invention.

FIG. 2 is a sectional view of a communication device 200 according to an embodiment of the invention. FIG. 2 is similar to FIG. 1A. In the embodiment of FIG. 2, the communication device 200 further includes a control motor element 260 configured to generate the aforementioned control signal SC and transmit it to the first turning wheel 130 and the second turning wheel 140. By controlling the first turning wheel 130, the second turning wheel 140, and the nonconductive track 110, the control motor element 260 can make the antenna element 120 generate a top radiation pattern 151, a bottom radiation pattern 152, a left radiation pattern 153, and a right radiation pattern 154. However, the invention is not limited thereto. In alternative embodiments, the antenna element 120 of the communication device 200 can provide more radiation patterns in different directions. Other features of the communication device 200 of FIG. 2 are similar to those of the communication device 100 of FIG. 1A and FIG. 1B. Therefore, the two embodiments can achieve similar levels of performance.

Figure 3A:
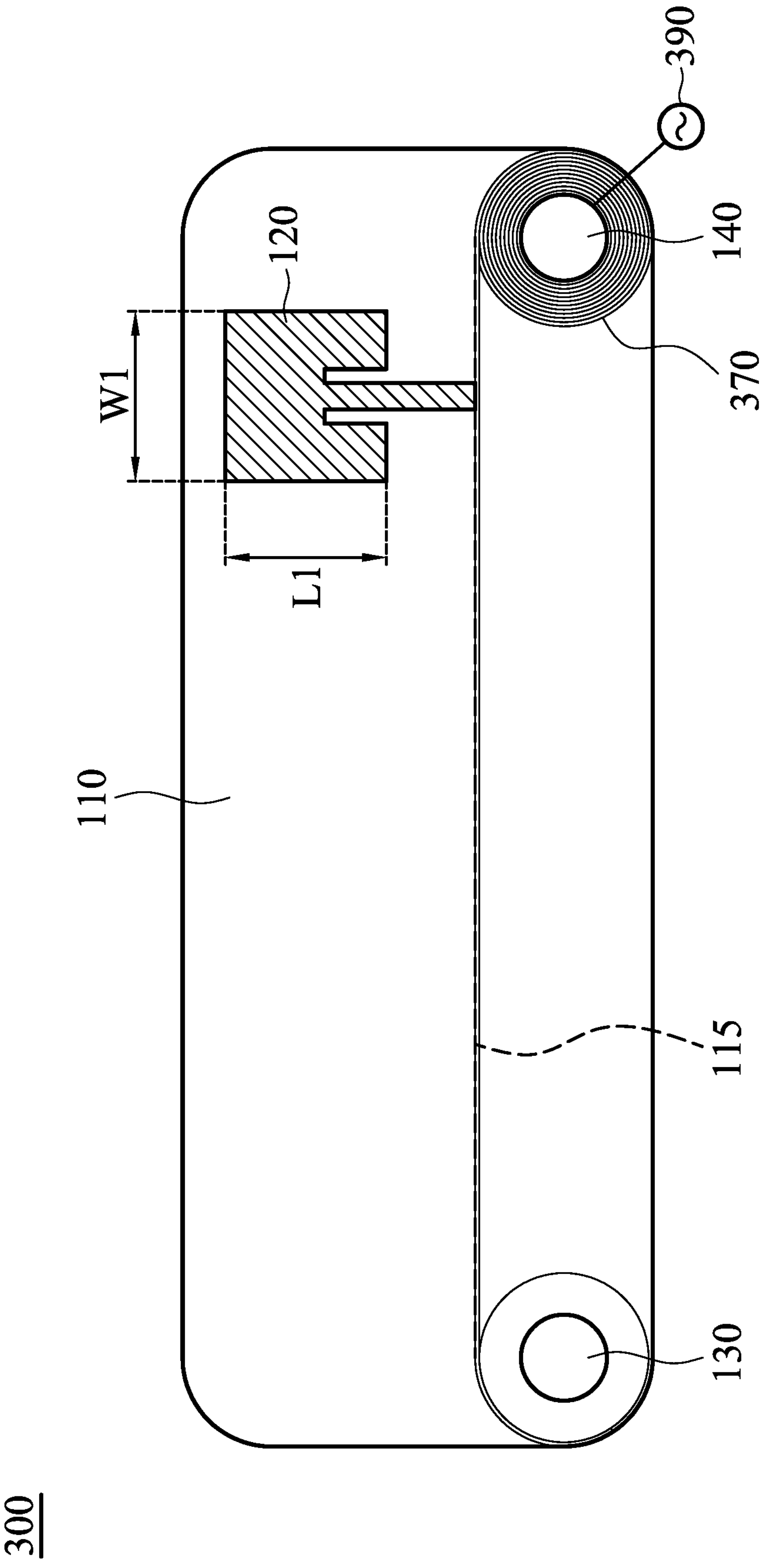
FIG. 3A is a perspective view of a communication device according to an embodiment of the invention.

FIG. 3A is a perspective view of a communication device 300 according to an embodiment of the invention. FIG. 3A is similar to FIG. 1A. In the embodiment of FIG. 3A, the communication device 300 further includes a cable 370 and a signal source 390. The signal source 390 is coupled through the cable 370 to the antenna element 120. For example, the cable 370 may be a coaxial cable, and the signal source 390 may be an RF (Radio Frequency) module for exciting the antenna element 120. It should be noted that the length of the cable 370 must be sufficient. Thus, the antenna element 120 can be moved by the nonconductive track 110, without interrupting the feeding mechanism. In some embodiments, the cable 370 is disposed along a slot line region 115 of the nonconductive track 110, and may be scrolled using the first turning wheel 130 or the second turning wheel 140.

Figure 3B:
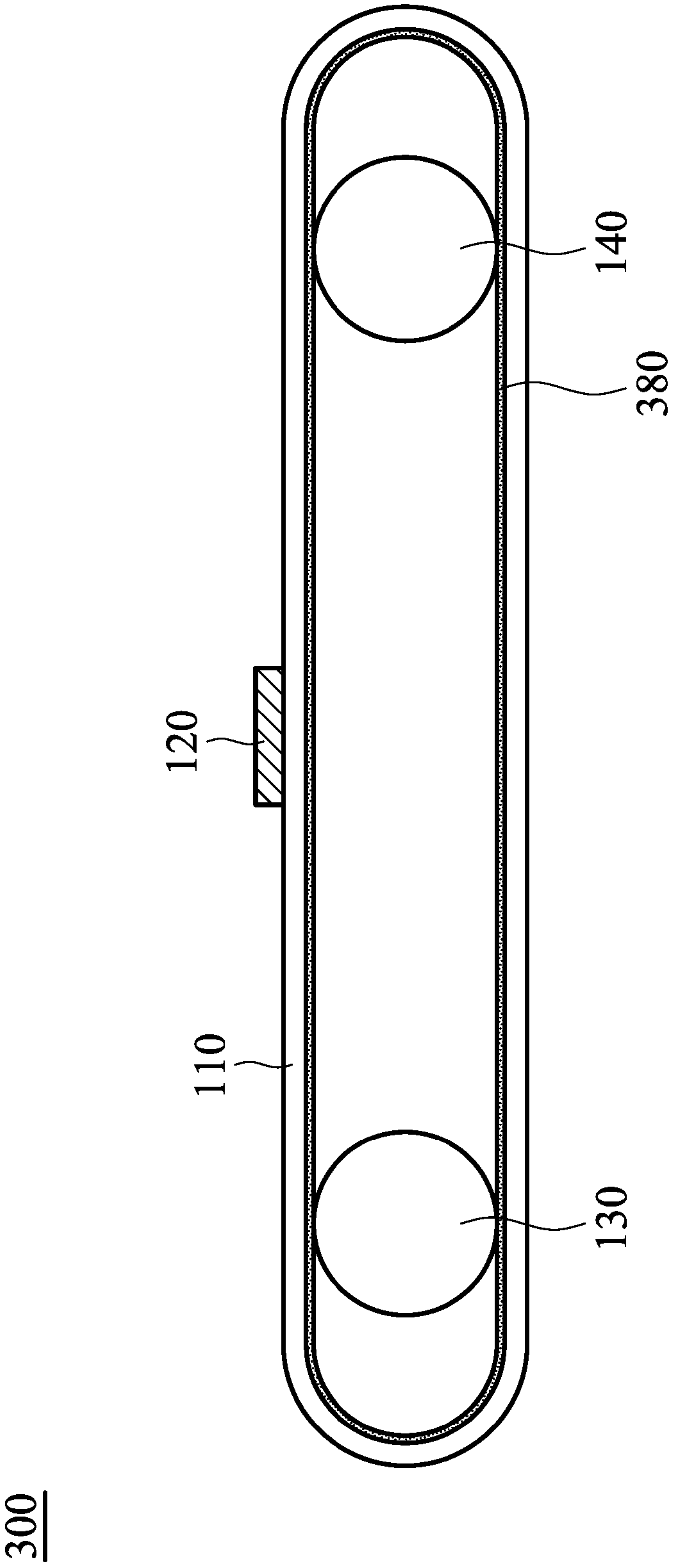
FIG. 3B is a sectional view of the communication device according to an embodiment of the invention.

FIG. 3B is a sectional view of the communication device 300 according to an embodiment of the invention. In the embodiment of FIG. 3B, the communication device 300 further includes a ground element 380, which is made of a metal material. The ground element 380 may have a closed loop shape. The ground element 380 is surrounded by the nonconductive track 110. For example, the ground element 380 may be disposed on or attached to an inner surface of the nonconductive track 110. The ground element 380 is adjacent to the antenna element 120. The nonconductive track 110 may be positioned between the antenna element 120 and the ground element 380. It should be noted that the term "adjacent" or "close" over the disclosure means that the distance (spacing) between two corresponding elements is smaller than a predetermined distance (e.g., 10 mm or shorter), or means that the two corresponding elements directly touch each other (i.e., the aforementioned distance/spacing therebetween is reduced to 0). According to practical measurements, the incorporation of the ground element 380 helps to increase the radiation gain of the antenna element 120.

Figure 4:
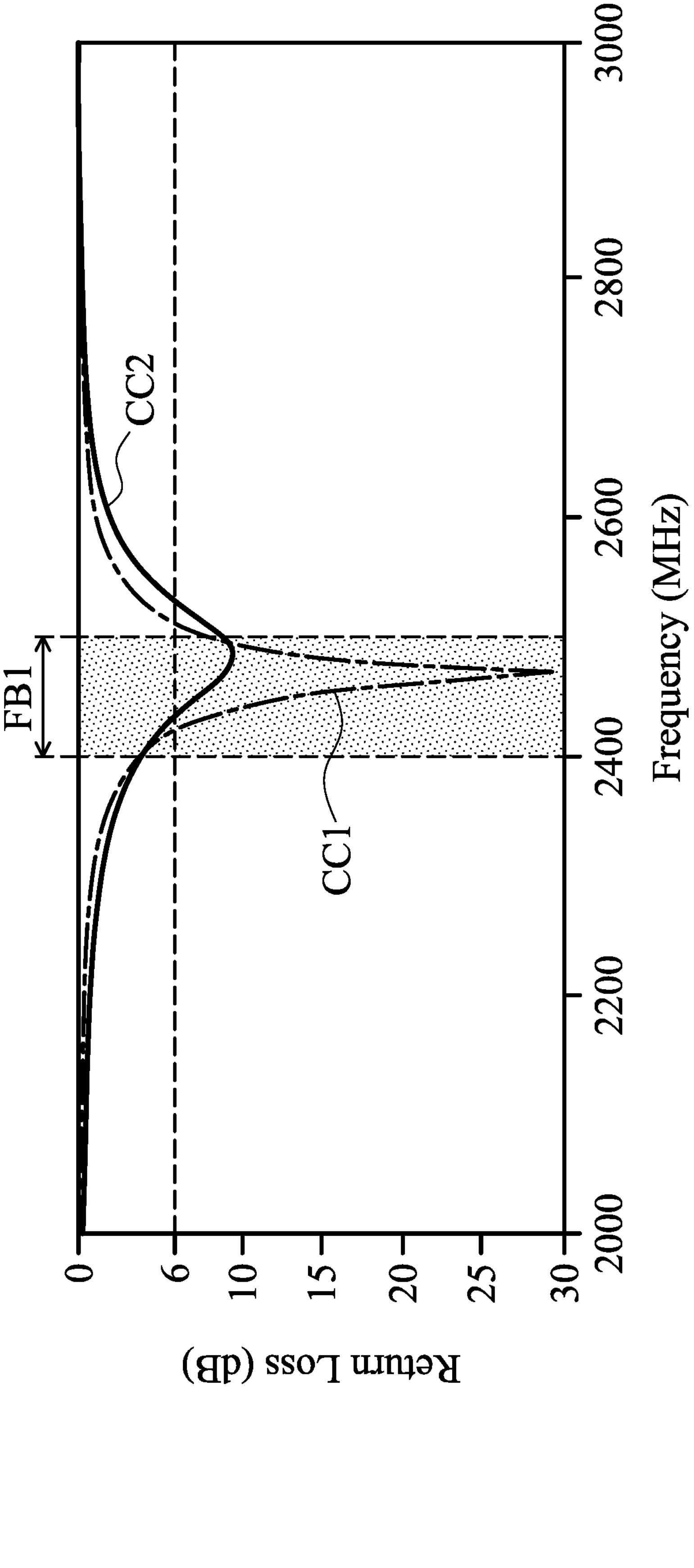
FIG. 4 is a diagram of return loss of an antenna element of a communication device according to an embodiment of the invention.

FIG. 4 is a diagram of the return loss of the antenna element 120 of the communication device 300 according to an embodiment of the invention. The horizontal axis represents the operational frequency (MHz), and the vertical axis represents the return loss (dB). As shown in FIG. 4, a first curve CC1 represents the operational characteristics of the antenna element 120 when it is moved to the top or the bottom of the communication device 300, and a second curve CC2 represents the operational characteristics of the antenna element 120 when it is moved to the left or the right of the communication device 300. According to the measurement of FIG. 4, the antenna element 120 of the communication device 300 can cover an operational frequency band FB1, regardless of the antenna positions. For example, the operational frequency band FB1 may be from 2400 MHz to 2500 MHz. Thus, the antenna element 120 of the communication device 300 can support at least the wideband operation of WLAN (Wireless Local Area Network) 2.4 GHz. In addition, within the aforementioned operational frequency band FM, the radiation gain of the antenna element 120 can reach at least 5.5 dBi. However, the invention is not limited thereto. In alternative embodiments, the antenna element 120 can cover an mmWave (Millimeter Wave) frequency band, so as to support the wideband operation of the next 5G (5th Generation Wireless Systems). With respect the element sizes, the length L1 of the antenna element 120 may be substantially equal to 0.5 wavelength (λ/2) of the operational frequency band FM, and the width W1 of the antenna element 120 may be longer than or equal to the length L1 of the antenna element 120. Other features of the communication device 300 of FIG. 3A and FIG. 3B are similar to those of the communication device 100 of FIG. 1A and FIG. 1B. Therefore, the two embodiments can achieve similar levels of performance.

Figure 5:
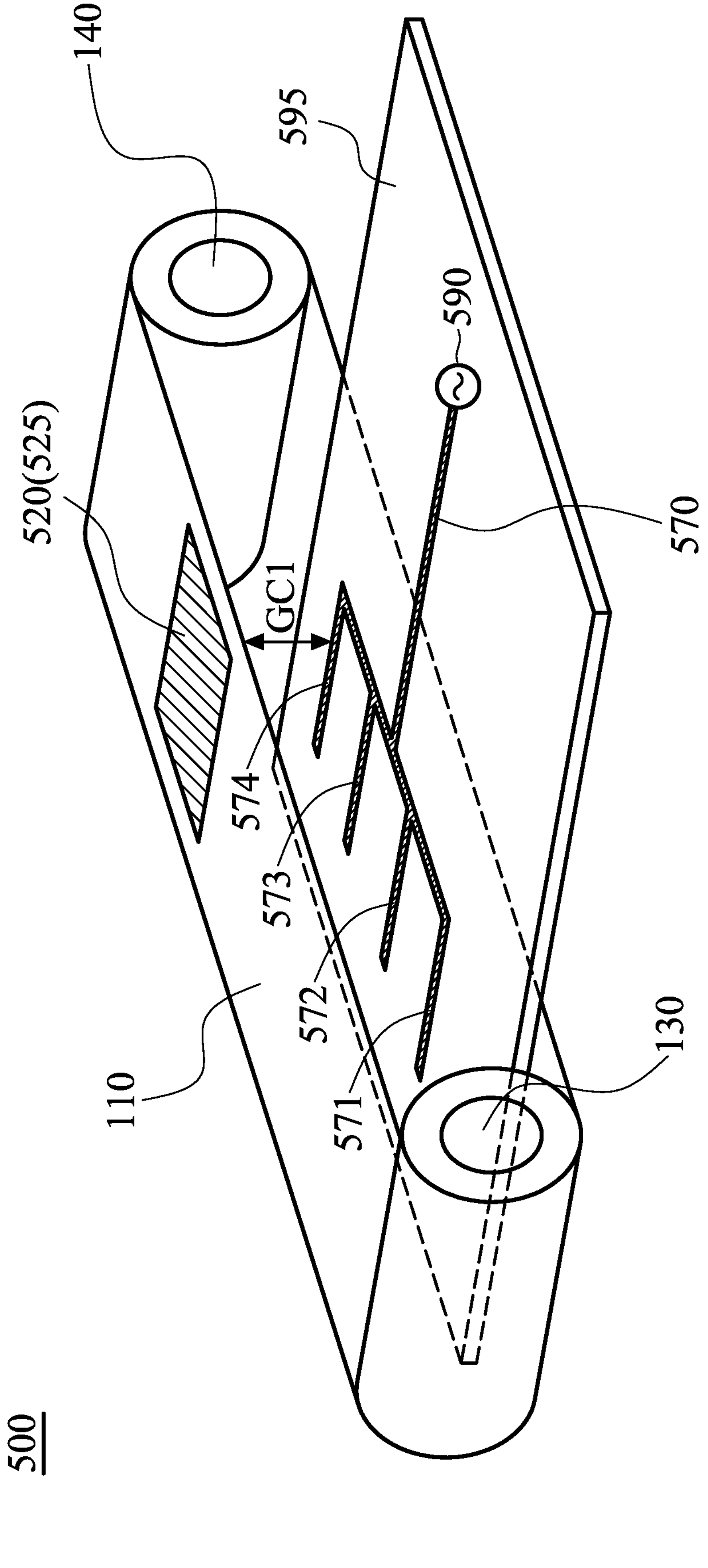
FIG. 5 is a perspective view of a communication device according to an embodiment of the invention.

FIG. 5 is a perspective view of a communication device 500 according to an embodiment of the invention. FIG. 5 is similar to FIG. 1A. In the embodiment of FIG. 5, an antenna element 520 of the communication device 500 is a coupling feeding antenna, and the communication device 500 does not need to use any cable. The antenna element 520 includes a main radiation element 525. For example, the main radiation element 525 may have a rectangular shape or a square shape, but it is not limited thereto. In addition, the communication device 500 further includes a coupling feeding element 570, a signal source 590, and a dielectric substrate 595. The coupling feeding element 570 is coupled to the signal source 590. The coupling feeding element 570 is adjacent to the main radiation element 525. A coupling gap GC1 is formed between the main radiation element 525 and the coupling feeding element 570, such that the antenna element 520 is excited by the coupling feeding element 570 using a coupling mechanism. Specifically, the coupling feeding element 570 may include a plurality of feeding branches 571, 572, 573 and 574, which may substantially have a plurality of straight-line shapes parallel to each other. The feeding branches 571, 572, 573 and 574 correspond to different positions of the antenna element 520, thereby increasing a coupling amount between the coupling feeding element 570 and the main radiation element 525. It should be understood that the number and the arrangements of the feeding branches 571, 572, 573 and 574 are adjustable according to different requirements. The dielectric substrate 595 may be an FR4 (Flame Retardant 4) substrate, a PCB (Printed Circuit Board) or an FPC (Flexible Printed Circuit). The signal source 590 and the coupling feeding element 570 are both disposed on the dielectric substrate 595. With such a design, since there is no cable in use, the antenna element 520 of the communication device 500 is smoothly moved by the nonconductive track 110, and its total manufacturing cost is further reduced. Other features of the communication device 500 of FIG. 5 are similar to those of the communication device 100 of FIG. 1A and FIG. 1B. Therefore, the two embodiments can achieve similar levels of performance.

Figure 6:
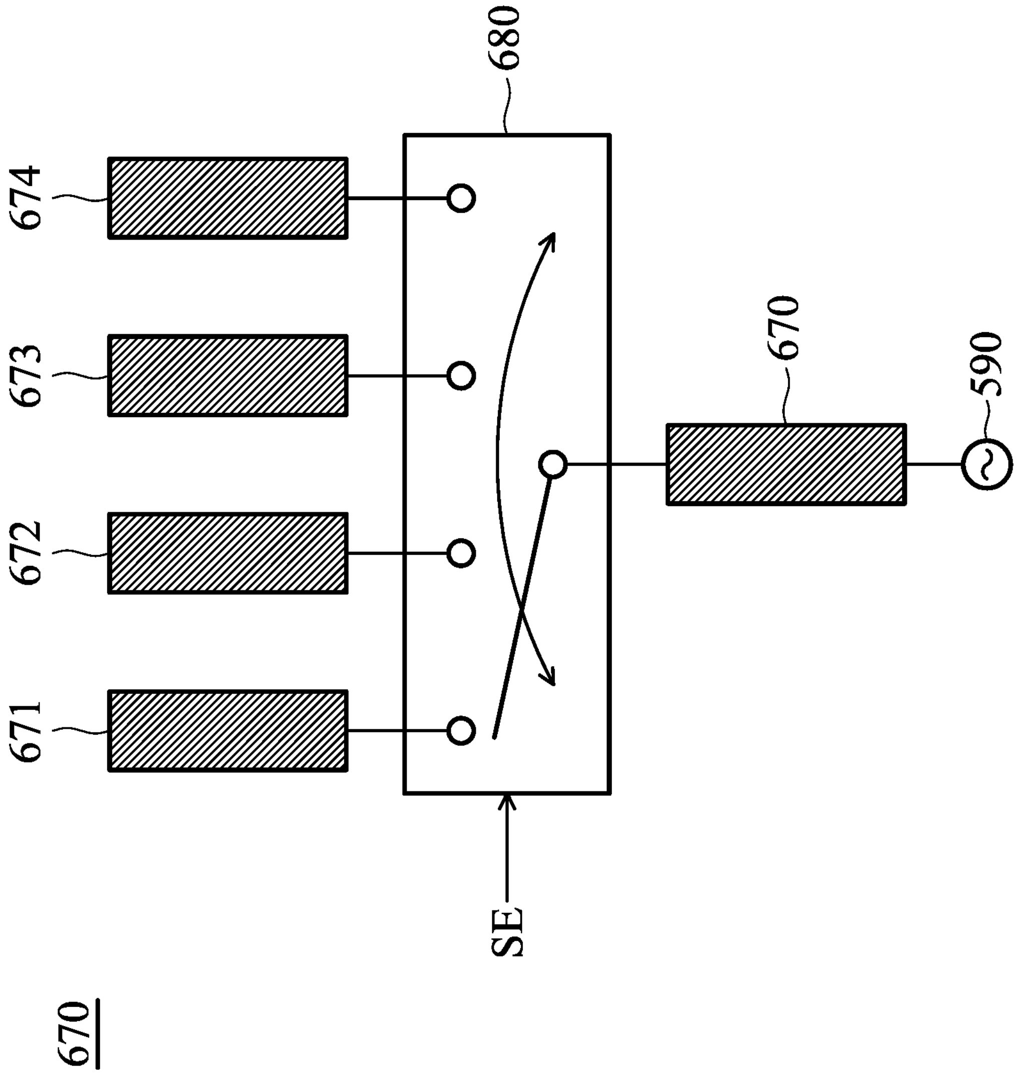
FIG. 6 is a top view of a coupling feeding element according to another embodiment of the invention.

FIG. 6 is a top view of a coupling feeding element 670 according to another embodiment of the invention. The coupling feeding element 670 is applicable to the aforementioned communication device 500. In the embodiment of FIG. 6, the coupling feeding element 670 includes a plurality of feeding branches 671, 672, 673 and 674 and a switch circuit 680. Specifically, the switch circuit 680 is switchable between the feeding branches 671, 672, 673 and 674 according to a selection signal SE, so as to selectively use one of the feeding branches 671, 672, 673 and 674. For example, the selection signal SE may be generated by a processor according to a user input (not shown). With such a design, the coupling feeding element 670 can concentrate the output power of the signal source 590 on the selected feeding branch (which may be the closest to the relative antenna element), thereby increasing the radiation efficiency of the relative antenna element. In alternative embodiments, the selection signal SE is appropriately adjusted according to the control signal SC of the control motor element 260.

The invention proposes a novel communication device, which includes a movable antenna element. In comparison to the conventional design, the invention has at least the advantages of almost omnidirectional characteristics, small size, wide bandwidth, and low complexity. Therefore, the invention is suitable for application in a variety of devices.

Note that the above element sizes, element shapes, and frequency ranges are not limitations of the invention. A designer can fine-tune these settings to meet specific requirements. It should be understood that the communication device of the invention is not limited to the configurations of FIGS. 1-6. The invention may include any one or more features of any one or more embodiments of FIGS. 1-6. In other words, not all of the features displayed in the figures should be implemented in the communication device of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered as exemplary only, with a true scope of the disclosed embodiments being indicated by the following claims and their equivalents.

What is claimed is:

1. A communication device, comprising:

a nonconductive track;

an antenna element, disposed on the nonconductive track;

a first turning wheel; and a second turning wheel, wherein the first turning wheel and the second turning wheel drive the nonconductive track according to a control signal, so as to adjust a position of the antenna element, wherein the antenna element comprises a main radiation element, wherein the main radiation element has a rectangular shape or a square shape, and wherein the communication device further comprises:

a signal source;

a coupling feeding element, coupled to the signal source, wherein the coupling feeding element is adjacent to the main radiation element; and a dielectric substrate, wherein the signal source and the coupling feeding element are disposed on the dielectric substrate.

2. The communication device as claimed in claim 1, wherein the communication device provides an almost omnidirectional radiation pattern.

3. The communication device as claimed in claim 1, wherein the nonconductive track is made of a rubbery material.

4. The communication device as claimed in claim 1, further comprising:

a control motor element, configured to generate the control signal.

5. The communication device as claimed in claim 4, wherein by controlling the nonconductive track, the control motor element makes the antenna element generate a top radiation pattern, a bottom radiation pattern, a left radiation pattern, and a right radiation pattern.

6. The communication device as claimed in claim 1, wherein the antenna element is a patch antenna.

7. The communication device as claimed in claim 1, wherein the antenna element covers an operational frequency band from 2400 MHz to 2500 MHz.

8. The communication device as claimed in claim 7, wherein a length of the antenna element is substantially equal to 0.5 wavelength of the operational frequency band.

9. The communication device as claimed in claim 1, wherein the antenna element covers an mmWave (Millimeter Wave) frequency band.

10. The communication device as claimed in claim 1, further comprising:

a cable, wherein the signal source is coupled through the cable to the antenna element.

11. The communication device as claimed in claim 1, further comprising:

a ground element, having a closed loop shape, wherein the ground element is surrounded by the nonconductive track.

12. The communication device as claimed in claim 1, wherein the antenna element is a coupling feeding antenna.

13. The communication device as claimed in claim 1, wherein the coupling feeding element comprises a plurality of feeding branches.

14. The communication device as claimed in claim 13, wherein the coupling feeding element further comprises a switch circuit for selectively using one of the feeding branches.

* * * * *